(12) United States Patent
Endo

(10) Patent No.: US 12,214,624 B2
(45) Date of Patent: Feb. 4, 2025

(54) PNEUMATIC TIRE

(71) Applicant: The Yokohama Rubber Co., LTD., Tokyo (JP)

(72) Inventor: Toyoaki Endo, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 453 days.

(21) Appl. No.: 16/958,566

(22) PCT Filed: Dec. 27, 2018

(86) PCT No.: PCT/JP2018/048051
§ 371 (c)(1),
(2) Date: Jun. 26, 2020

(87) PCT Pub. No.: WO2019/131837
PCT Pub. Date: Jul. 4, 2019

(65) Prior Publication Data
US 2021/0061019 A1    Mar. 4, 2021

(30) Foreign Application Priority Data
Dec. 28, 2017 (JP) .................................. 2017-253997

(51) Int. Cl.
*B60C 11/12* (2006.01)
*B60C 11/03* (2006.01)
*B60C 11/13* (2006.01)

(52) U.S. Cl.
CPC ...... *B60C 11/1376* (2013.01); *B60C 11/0304* (2013.01); *B60C 11/1218* (2013.01);
(Continued)

(58) Field of Classification Search
CPC ........... B60C 11/1218; B60C 11/12222; B60C 11/1281; B60C 11/1204; B60C 11/12; B60C 2011/1227; B60C 11/1376
See application file for complete search history.

(56) References Cited

U.S. PATENT DOCUMENTS

| 6,668,886 B1 | 12/2003 | Iwamura |
| 2013/0126062 A1 | 5/2013 | Palgen |

(Continued)

FOREIGN PATENT DOCUMENTS

| CN | 107074026 | 8/2017 |
| JP | H10-052824 | 2/1998 |

(Continued)

OTHER PUBLICATIONS

JP 2007-022361 Machine Translation; Yoshida, Hiroto (Year: 2007).*

(Continued)

*Primary Examiner* — Katelyn W Smith
*Assistant Examiner* — Nicholas J Weiler
(74) *Attorney, Agent, or Firm* — Thorpe North & Western

(57) ABSTRACT

A tread portion of a pneumatic tire includes: an intermediate land portion being delimited by an inner circumferential main groove and an outer circumferential main groove on one side in a tire lateral direction across a tire center line as a boundary; and a side land portion adjoining the outer circumferential main groove and being provided outward of the outer circumferential main groove in the tire lateral direction. At least one land portion of the intermediate land portion and the side land portion has a swelling profile line. In a region of the land portion, a composite sipe is provided. In the composite sipe, a first sipe extending linearly in a sipe depth direction and a second sipe (S2) extending in a wave manner in the sipe depth direction are connected. The second sipe in the composite sipe is disposed so as to be connected to the outer circumferential main groove.

14 Claims, 5 Drawing Sheets

(52) U.S. Cl.
CPC ... *B60C 11/0306* (2013.01); *B60C 2011/0381* (2013.01); *B60C 2011/1213* (2013.01); *B60C 2011/1227* (2013.01)

(56) References Cited

U.S. PATENT DOCUMENTS

| | | | | |
|---|---|---|---|---|
| 2013/0133799 | A1* | 5/2013 | Furusawa | B60C 11/11 152/209.21 |
| 2015/0041034 | A1 | 2/2015 | Matsushita | |
| 2015/0191051 | A1* | 7/2015 | Nagayasu | B60C 5/00 152/209.21 |
| 2016/0023516 | A1* | 1/2016 | Shima | B60C 11/1376 152/209.1 |
| 2017/0297377 | A1* | 10/2017 | Honda | B60C 11/0304 |

FOREIGN PATENT DOCUMENTS

| | | | |
|---|---|---|---|
| JP | H11-151914 | | 6/1999 |
| JP | H11-151914 A | * | 6/1999 |
| JP | 2000-238513 | | 9/2000 |
| JP | 2007022361 A | * | 2/2007 |
| JP | 2010013075 A | * | 1/2010 ............. B60C 11/01 |
| JP | 2013-523512 | | 6/2013 |
| JP | 2013-216271 A | | 10/2013 |
| JP | 2013-244907 | | 12/2013 |
| JP | 2015-182680 | | 10/2015 |
| WO | WO 2011/120817 | | 10/2011 |
| WO | WO 2013/136947 | | 9/2013 |
| WO | WO 2016/067533 | | 5/2016 |

OTHER PUBLICATIONS

JP 2010-013075 Machine Translation; Morito, Takumi (Year: 2010).*
JP H11-151914 Machine Translation; Katayama, Masahiro (Year: 1999).*
International Search Report for International Application No. PCT/JP2018/048051 dated Apr. 9, 2019, 4 pages, Japan.

* cited by examiner

PNEUMATIC TIRE

TECHNICAL FIELD

The present technology relates to a pneumatic tire.

BACKGROUND ART

In the related art, a tread pattern of a pneumatic tire is provided with: a plurality of circumferential main grooves extending in a circumferential direction; and lug grooves and sipes crossing land portions that are delimited in a tire lateral direction by the two circumferential main grooves. An all-season pneumatic tire (hereinafter referred to as an all-season tire) is regarded as an intermediate tire between a regular so-called "summer tire" used during a non-snow season and a snow tire referred to as a winter tire that is widely used in North America and Europe. For the all-season tire, excellent control performance and braking and driving performance on snow-covered road surfaces (snow performance) are demanded. Thus, for the purpose of increasing edge components, a number of sipes and lug grooves are provided in addition to the circumferential main grooves.

For example, there has been known a pneumatic tire that ensures on-snow performance and improves uneven wear resistance at a central portion in a tread lateral direction (see Japan Unexamined Patent Publication No. 2013-244907).

The pneumatic tire includes: a center circumferential main groove, which is formed in a center of a tread in a tire lateral direction and extends in a tire circumferential direction; an outer circumferential main groove, which is formed adjacent to the center circumferential main groove outward of the center circumferential main groove in the tire lateral direction in the tread and extends in the tire circumferential direction; a lateral main groove, which is formed in the tread, extends in a direction intersecting the tire circumferential direction, communicates with the center circumferential main groove and the outer circumferential main groove, and has a groove depth that is larger than a groove depth of the center circumferential main groove and smaller than a groove depth of the outer circumferential main groove with respect to a tread surface as a reference; and a center block, which is delimited by the center circumferential main groove, the outer circumferential main groove, and the lateral main groove. Further, sipes are provided in a groove bottom of the center circumferential main groove.

In the pneumatic tire, on-snow performance can be ensured with an edge of the center block formed with the lateral main groove. Further, the lateral main groove communicates with the center circumferential main groove and the outer circumferential main groove, the groove depth of the lateral main groove is set to be shallower than the groove depth of the outer circumferential main groove, and the groove depth of the center circumferential main groove is set to be shallower than that of the lateral main groove. Thus, rigidity of the center block is ensured, and excessive deformation of the center block is suppressed during loaded rolling of the tire. With this, heel-and-toe wear of the center block can be suppressed. As a result, on-snow performance can be ensured, and uneven wear resistance at the central portion in the tread lateral direction can be improved.

The pneumatic tire has excellent uneven wear resistance. However, there is a problem in that pattern noise is increased due to high rigidity of the center block.

In this manner, in the pneumatic tire, when block rigidity of the land portion is increased for the purpose of improving uneven wear resistance, pattern noise is increased. Thus, it is difficult to provide a tread pattern that improves uneven wear resistance and mitigates pattern noise at the same time.

SUMMARY

The present technology provides a pneumatic tire capable of improving uneven wear resistance and mitigating pattern noise at the same time with a new tread pattern that is different from the tread pattern described above.

An aspect of the present technology is a pneumatic tire including a tread portion.

The tread portion includes: an intermediate land portion delimited by two circumferential main grooves in a tire lateral direction, the intermediate land portion being positioned on one side in the tire lateral direction across a tire center line as a boundary; and a side land portion adjoining an outer circumferential main groove of the two circumferential main grooves, the side land portion being provided outside the outer circumferential main groove in the tire lateral direction, and including a ground contact edge of the pneumatic tire within a region thereof.

The tread portion has, in a profile cross section of at least one land portion of the intermediate land portion and the side land portion along the tire lateral direction, a swelling profile line that protrudes outward in a tire radial direction with respect to a base profile line that is an arc of a circle having a center point positioned on the tire center line and passing through at least two land portion edge points at which the intermediate land portion is connected to the two circumferential main grooves and one side land portion edge point at which the side land portion is connected to the outer circumferential main groove, the tread portion being provided with a plurality of sipes extending in the tire lateral direction at an interval in a tire circumferential direction in a region of a swelling land portion formed in the swelling profile line in the intermediate land portion or the side land portion.

The plurality of sipes include: first sipes having a shape extending linearly from the tread surface in a sipe depth direction; and second sipes being bent or curved in a wave manner and protruding in a direction orthogonal to the sipe depth direction and orthogonal to an extension direction in which the plurality of sipes extend on the tread surface, when advancing from the tread surface in the sipe depth direction, and the plurality of sipes are composite sipes each formed by one of the first sipes and one of the second sipes connected each other in the extension direction.

The second sipes are positioned on a side of the outer circumferential main groove with respect to the first sipes in the swelling land portion, and the second sipes are opened to the outer circumferential main groove.

Lengths of the composite sipes in the tire lateral direction may be 40% or more of a length of a contact region in contact with a road surface in the swelling land portion in the tire lateral direction, and lengths of the second sipes in the extension direction may fall within a range of from 20% to 80% of the lengths of the composite sipes along the extension direction.

The swelling land portion may include the intermediate land portion. The tread portion comprises a boundary inner region that is positioned inward in the tire lateral direction with respect to a boundary position that is an innermost position in the tire lateral direction of a plurality of connecting positions in the intermediate land portion in the tire lateral direction, the plurality of connecting positions each being a position at which one of the second sipes and one of the first sipes are connected each other. A total length of lengths of all the first sipes along the extension direction within the boundary inner region, may be 70% or more of a total length of lengths of all sipes within the boundary inner region along the extension direction.

The swelling land portion may include the intermediate land portion. The composite sipes in the intermediate land portion may be opened to the two circumferential main grooves. The first sipes may be positioned on a side of an inner circumferential main groove positioned inward in the tire lateral direction of the two circumferential main grooves with respect to the regions provided with the second sipes and are opened to the inner circumferential main groove.

Further, each of the composite sipes in the intermediate land portion may include a peak-shaped sipe protruding to one side in the tire circumferential direction, and a connecting position in the tire lateral direction at which the second sipes and the first sipes are connected and may be positioned outward in the tire lateral direction with respect to a position of a protrusion end of the peak-shaped sipe in the tire lateral direction.

The swelling land portion may include the side land portion, and the first sipes in the composite sipes provided in a region of the side land portion may be positioned in a contact region in which the side land portion is in contact with a road surface.

The tread portion may include the swelling land portion and the composite sipes on each of both sides in the tire lateral direction across the tire center line as a boundary. The tread portion may include a center land portion through which the tire center line passes, the center land portion being delimited by the intermediate land portion on each of both the sides in the tire lateral direction. The swelling land portion may include the intermediate land portion and the side land portion. A profile line of the center land portion may be the base profile line. A region of the center land portion may be provided with the first sipes.

When the swelling land portion is viewed from outward in the tire radial direction, the second sipes may meander in a wave-like shape.

According to the pneumatic tire described above, uneven wear resistance can be improved, and pattern noise can be mitigated at the same time.

DETAILED DESCRIPTION

Figure 1:
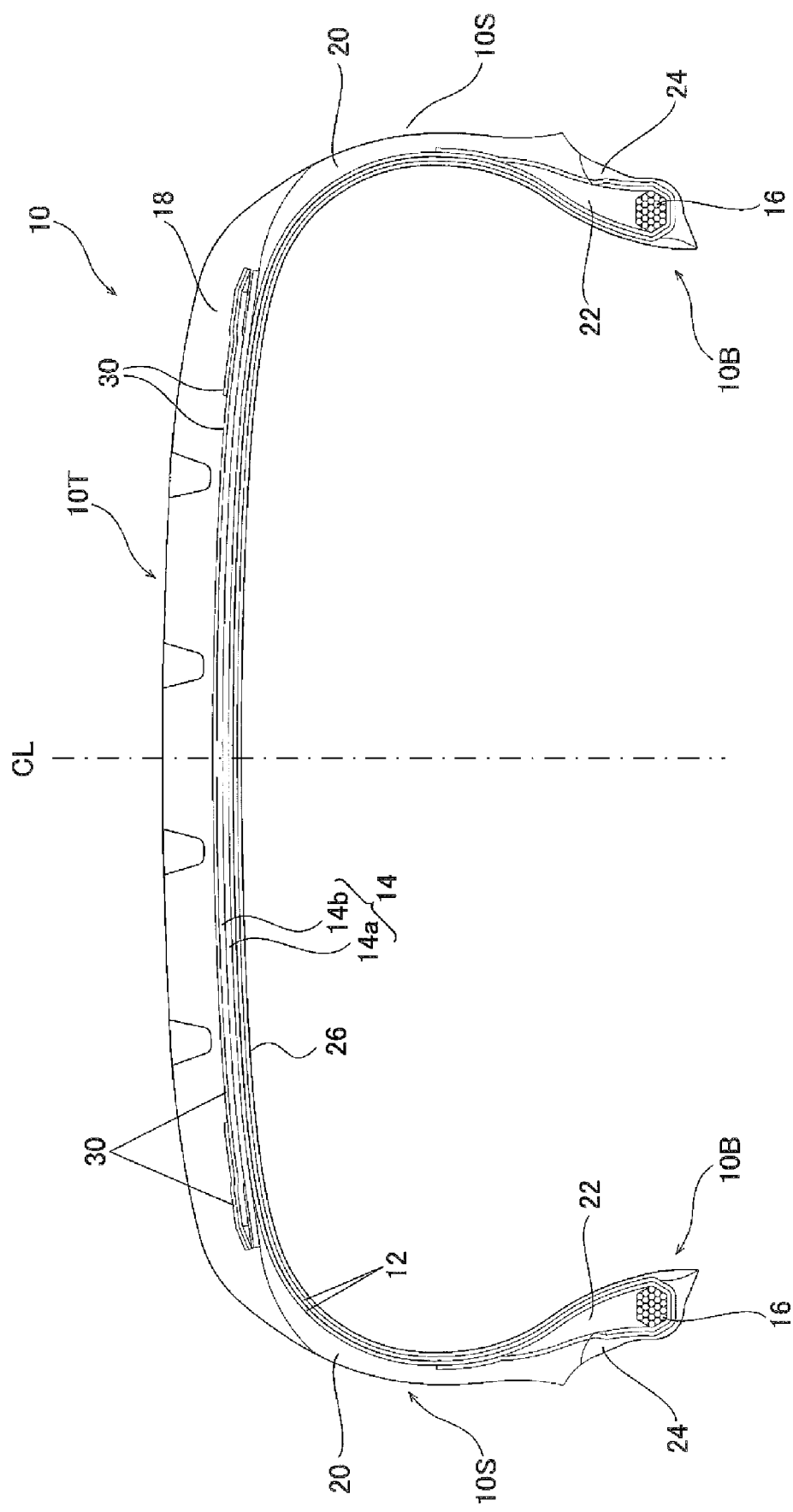
FIG. 1 is a tire cross-sectional view illustrating a tire according to an embodiment.

A pneumatic tire according to embodiments of the present technology will be described below in detail with reference to the accompanying drawings.

The pneumatic tire of the present embodiment described below is, for example, applied to an all-season tire for a passenger vehicle and may also be applied to an all-season tire for a small truck or an all-season tire for a bus and a truck. The pneumatic tire of the present embodiment described below is an all-season tire for a passenger vehicle.

Herein, "tire lateral direction" is the direction parallel with the rotation axis of the pneumatic tire. "Outward in the tire lateral direction" is the direction in the tire lateral direction away from a tire equator line CL that represents the tire equatorial plane with respect to the position of comparison. "Inward in the tire lateral direction" is the direction in the tire lateral direction toward the tire equator line CL with respect to the position of comparison. "Tire circumferential direction" is the direction in which the pneumatic tire rotates about the rotation axis of the pneumatic tire. "Tire circumferential direction" includes two distinct directions: a first direction and a second direction. "Tire radial direction" is the direction orthogonal to the rotation axis of the pneumatic tire. "Outward in the tire radial direction" is the direction away from the rotation axis along the tire radial direction with respect to the position of comparison. "Inward in the tire radial direction" is the direction toward the rotation axis along the tire radial direction with respect to the position of comparison.

"Region being in contact with road surfaces" in the present specification refers to a region of a tread surface of a land portion of the tire and refers to a region inward in the tire lateral direction of ground contact edges, which are on both sides in the tire lateral direction. "Ground contact edge" refers to an outermost edge, in the tire lateral direction, of a tire ground contact region formed on a flat plate when the tire is mounted on a specified rim and inflated to a specified internal pressure and is placed perpendicularly to the flat plate in a static state and subjected to a load corresponding to a specified load. "Specified rim" refers to an "applicable rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by TRA, or to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in the case of JATMA, for a passenger vehicle tire, the specified internal pressure is an air pressure of 180 kPa, and the specified load is 88% of the maximum load capacity.

Tire Structure

FIG. 1 is a tire cross-sectional view illustrating a tire 10 according to an embodiment. The tire 10 includes a tread portion 10T including a tread pattern, a pair of bead portions 10B, and a pair of side portions 10S provided on both sides of the tread portion 10T and connecting the pair of bead portions 10B with the tread portion 10T.

The tire 10 includes: a carcass ply layer 12, a belt layer 14, and bead cores 16 as framework members or layers of framework members and mainly includes: a tread rubber member 18, side rubber members 20, bead filler rubber members 22, rim cushion rubber members 24, and an innerliner rubber member 26 around the framework members.

The carcass ply layer 12 is composed of a carcass ply member that is made of organic fibers covered with rubber and that is wound between a pair of the annular bead cores 16 and formed into a toroidal shape. The carcass ply member is wound around the bead cores 16 and extends outward in the tire radial direction. The belt layer 14 is provided outward of the carcass ply layer 12 in the tire radial direction and is composed of two belt members 14a, 14b. The belt layer 14 is a member composed of rubber-covered steel cords that are disposed inclined at a predetermined angle of, for example, from 20 to 30 degrees with respect to the tire circumferential direction. A width in the tire lateral direction of the lower layer belt member 14a is greater than that of the upper layer belt member 14b. The steel cords of the two belt members 14a, 14b are inclined in opposite directions to each other. As such, the belt members 14a, 14b are crossing layers serving to suppress expansion of the carcass ply layer 12 due to the inflated air pressure.

The tread rubber member 18 is provided outward of the belt layer 14 in the tire radial direction. The side rubber members 20 are connected to both end portions of the tread rubber member 18, thus forming the side portions 10S. The rim cushion rubber members 24 are provided at the ends of the side rubber members 20 inward in the tire radial direction and come into contact with a rim on which the tire 10 is mounted. The bead filler rubber members 22 are provided outward of the bead cores 16 in the tire radial direction. Thus, each of the bead filler rubber members 22 is sandwiched between a portion of the carcass ply layer 12 before being wound around the bead core 16 and a portion of the carcass ply layer 12 after being wound around the bead core 16. The innerliner rubber member 26 is provided on the inner surface of the tire 10 facing a tire cavity region that is inflated with air and is surrounded by the tire 10 and the rim.

In addition, the tire 10 is provided with two belt cover layers 30, which cover the belt layer 14 from outward of the belt layer 14 in the tire radial direction and are formed from organic fibers or steel cords covered with rubber. Also, the tire 10 may include a bead stiffener between the carcass layer 12 wound around the bead core 16 and the bead filler rubber member 22.

The tire structure of the present embodiment is as described above. However, the tire structure is not particularly limited and a known tire structure is applicable.

Tread Pattern

Figure 2:
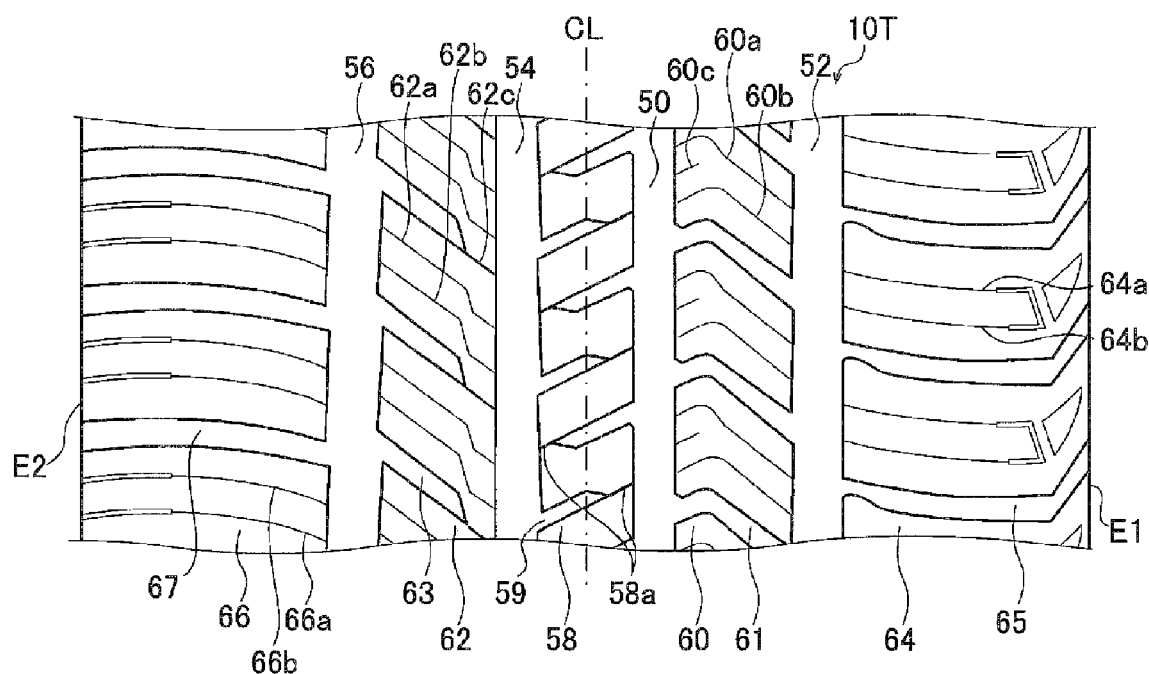
FIG. 2 is a diagram illustrating a tread pattern according to the embodiment.

FIG. 2 is a diagram illustrating an example of the tread pattern according to the present embodiment.

As illustrated in FIG. 2, the tread pattern of the tread portion 10T mainly includes: inner circumferential main grooves 50 and 54, outer circumferential main grooves 52 and 56, center land portion 58, intermediate land portions 60 and 62, side land portions 64 and 66, and lug grooves 59, 61, 63, 65, and 67.

The inner circumferential main grooves 50 and 54 are positioned inward of the outer circumferential main grooves 52 and 56 in the tire lateral direction (on the tire equator line CL side) and are disposed to adjoin the center land portion 58. In this manner, the center land portion 58 is delimited in the tire lateral direction.

The outer circumferential main grooves 52 and 56 are positioned outward of the inner circumferential main grooves 50 and 54 in the tire lateral direction and are disposed to adjoin the intermediate land portions 60 and 62. In this manner, together with the inner circumferential main grooves 50 and 54, the intermediate land portions 60 and 62 are delimited in the tire lateral direction.

Further, the outer circumferential main grooves 52 and 56 adjoin the side land portions 64 and 66 outward in the tire lateral direction. The side land portions 64 and 66 extend to reach tread pattern ends E1 and E2.

Specifically, the tread portion 10T includes, on both the sides in the tire lateral direction across the tire equator line (tire center line) CL as a boundary, the intermediate land portion 60 and the intermediate land portion 62, which are delimited by the inner circumferential main groove 50 and the outer circumferential main groove 52; and the inner circumferential main groove 54 and the outer circumferential main groove 56 in the tire lateral direction. Further, the tread portion 10T includes the side land portions 64 and 66, which adjoin the outer circumferential main groove 52 and the outer circumferential main groove 56, are formed outward of the outer circumferential main grooves 52 and 56 in the tire lateral direction, and include the ground contact edges of the pneumatic tire 10 in the regions thereof.

Note that among the two circumferential main grooves that respectively delimit the intermediate land portions 60 and 62 provided both the sides in the tire lateral direction across the tire equator line CL as a boundary, the inner circumferential main grooves 50 and 54 are not necessarily required to be provided on one side in the tire lateral direction. Specifically, in the embodiment, the inner circumferential main grooves 50 and 54 may be replaced with a structure in which one of the two circumferential main grooves, which is provided on the tire equator line CL and delimits the intermediate land portions 60 and 62, is shared as one inner circumferential main groove, specifically, with a structure in which the number of circumferential main grooves is three.

The lug groove 59 is a lug groove, which extends from the inner circumferential main groove 54 to the inner circumferential main groove 50, and is terminated without communicating with the inner circumferential main groove 50, or the lug groove 59 is a lug groove, which extends from the inner circumferential main groove 50 to the inner circumferential main groove 54, and is terminated without communicating with the inner circumferential main groove 54. The plurality of lug grooves 59 are provided at a predetermined interval in the tire circumferential direction. The lug grooves 59 extending from the inner circumferential main groove 50 and the lug grooves 59 extending from the inner circumferential main groove 54 are alternately provided in the tire circumferential direction. In the region of the center land portion 58, a sipe 58a, which extends from the terminal end of the lug groove 59 to communicate with the terminal end of the lug groove 59 and the inner circumferential main groove 50 or the inner circumferential main groove 54, is provided. The lug grooves 59 and the sipes 58a extend to be inclined in the same direction with respect to the tire lateral direction.

The lug groove 61 communicates with the inner circumferential main groove 50 and the outer circumferential main groove 52. The plurality of lug grooves 61 are provided at a predetermined interval in the tire circumferential direction and delimit the intermediate land portions 60 in the tire circumferential direction. Specifically, the intermediate land portion 60 is a block having a periphery delimited by the grooves. As illustrated in FIG. 2, when the tread surface is viewed from outward in the tire radial direction, the lug groove 61 has a peak-like shape, which has substantially the same groove width and protrudes to one side in the tire circumferential direction. As illustrated in FIG. 2, the position of the protrusion end of the peak-like shape in the tire lateral direction is offset inward in the tire lateral direction with respect to the center position of the intermediate land portion 60 in the tire lateral direction. In the region of the intermediate land portion 60, sipes 60a, 60b, and 60c are provided. The sipes 60a and 60b communicate with the inner circumferential main groove 50 and the outer circumferential main groove 52. When the tread surface is viewed from outward in the tire radial direction, similarly to the lug groove 61, the sipes 60a and 60b each form a peak-like shape protruding to one side in the tire circumferential direction and extend in parallel with the lug groove 61. As illustrated in FIG. 2, each of the positions of the protrusion ends of the sipes 60a and 60b in the tire lateral direction is offset inward in the tire lateral direction with respect to the center position of the intermediate land portion 60 in the tire lateral direction. Meanwhile, the sipe 60c is provided between the sipe 60a and the sipe 60b in the tire circumferential direction, extends outward in the tire lateral direction from the inner circumferential main groove 50 in parallel with the sipe 60a and the sipe 60b so as to be inclined with respect to the tire lateral direction, and is terminated in the region of the intermediate land portion 60.

The lug groove 63 extends from the outer circumferential main groove 56 to the inner circumferential main groove 54 and is terminated without communicating with the inner circumferential main groove 54. The plurality of lug grooves 63 are provided at a predetermined interval in the tire circumferential direction. In the region of the intermediate land portion 62, a sipe 62c, which extends from the terminal end of the lug groove 63 to communicate with the terminal end of the lug groove 63 and the inner circumferential main groove 54, is provided. Further, in the region of the intermediate land portion 62, which is between the lug grooves 63 adjacent to each other in the tire circumferential direction, sipes 62a and 62b, which communicate with the outer circumferential main groove 56 and the inner circumferential main groove 54, are provided. All the lug grooves 63, and the sipes 62a, 62b, and 62c are inclined with respect to the tire lateral direction, and the inclination direction is inclined from the tire lateral direction toward a side different from the inclination direction of the lug groove 59 and the sipe 58a in the tire circumferential direction. The sipes 62a and 62b include: steep inclination portions that are steeply inclined with respect to the tire lateral direction such that the inclination of the sipes 62a and 62b are close to the tire circumferential direction; and gentle inclination portions that are provided on both sides of the steep inclination portions and are gently inclined with respect to the tire lateral direction. The gentle inclination portions are opened in the inner circumferential main groove 54 and the outer circumferential main groove 56.

The lug groove 65 extends outward in the tire lateral direction from the outer circumferential main groove 52 to the pattern end E1. The plurality of lug grooves 65 are provided at a predetermined interval in the tire circumferential direction. In the region of the side land portion 64, which is between the lug grooves 65 adjacent to each other in the tire circumferential direction, sipes 64a and 64b, which extend outward in the tire lateral direction from the outer circumferential main groove 52, are provided.

The lug groove 67 extends outward in the tire lateral direction from the outer circumferential main groove 56 to the pattern end E2. The plurality of lug grooves 67 are provided at a predetermined interval in the tire circumferential direction. In the region of the side land portion 66, which is between the lug grooves 67 adjacent to each other in the tire circumferential direction, sipes 66a and 66b, which extend outward in the tire lateral direction from the outer circumferential main groove 56, are provided.

The groove depth of the inner circumferential main grooves 50 and 54 and the outer circumferential main grooves 52 and 56, and the groove depth of the lug grooves 59, 61, 63, 65, and 67 falls within a range of from, for example, 3.0 mm to 11.0 mm. The groove width of the inner circumferential main grooves 50 and 54 and the outer circumferential main grooves 52 and 56; and the groove width of the lug grooves 59, 61, 63, 65, and 67 fall within a range of from 1.5 mm to 17.5 mm.

The sipe depth of the sipes 58a, 60a, 60b, 60c, 62a, 62b, 62c, 64a, 64b, 66a, and 66b falls within a range of from, for example, 3.0 mm to 8.0 mm, and a distance between sipe wall surfaces falls within a range of from, for example 0.4 mm to 1.5 mm, alternatively, 0.4 mm or more and less than 1.5 mm. The sipes can be distinguished from the grooves by the range of dimensions of the depth and the distance between the sipe wall surfaces, which are distinguished from the groove depth and the groove width.

FIGS. 3A to 3E are diagrams illustrating embodiments of the sipes 60a, 60b, 62a, 62b, 64a, 64b, 66a, and 66b. FIGS. 4A and 4B are diagrams illustrating embodiments of the sipes 60a, 60b, 60c, 62a, 62b, 64a, 64b, 66a, and 66b, which are taken along the sipe depth.

Each of the sipes 60a, 60b, 62a, 62b, 64a, 64b, 66a, and 66b is a composite sipe in which a first sipe 51 and a second sipe S2 are connected.

Here, as illustrated in FIG. 4A, the first sipe 51 is a sipe having a shape extending linearly in the sipe depth direction from the tread surface. As illustrated in FIG. 4B, the second sipe S2 is a sipe, which protrudes in a direction orthogonal to the sipe depth direction and the sipe extension direction and is bent or curved in a wave manner when advancing from the tread surface in the sipe depth direction.

The sipe 58a provided in the region of the center land portion 58 is a sipe, which has a shape extending linearly from the tread surface in the sipe depth direction, specifically, and is regarded as the first sipe 51. The sipe 60c is also regarded as the first sipe 51.

Figure 3A:
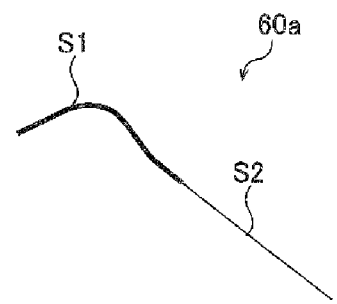
FIGS. 3A to 3E are diagrams illustrating embodiments of sipes provided in the tread pattern illustrated in FIG. 2.
Figure 4A:
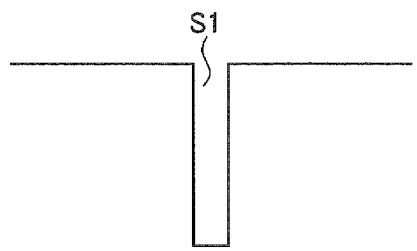
FIGS. 4A and 4B are diagrams illustrating the embodiments of the sipes illustrated in FIGS. 3A to 3E, which are taken along a sipe depth direction.
Figure 4B:
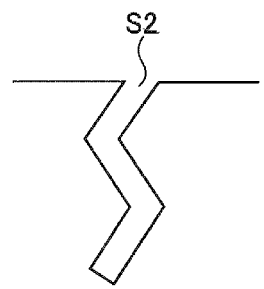

As understood from FIG. 2 and FIG. 3A, in each of the sipes 60a and 60b, the second sipe S2 is provided on the side of the outer circumferential main groove 52, and the first sipe 51 is provided on the side of the inner circumferential main groove 50. In each of the sipes 60a and 60b, the connection position of the first sipe 51 and the second sipe S2 is provided such that the top portion of the peak-like shape of each of the sipes 60a and 60b protruding to one side in the tire circumferential direction functions as the first sipe 51.

Figure 3B:
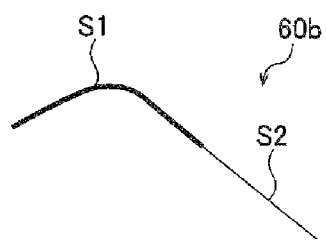
Figure 3C:
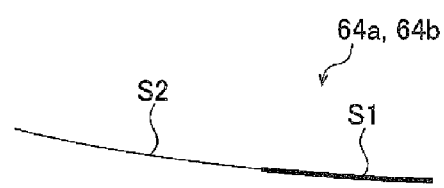

As understood from FIG. 2 and FIG. 3C, in each of the sipes 64a and 64b, the second sipe S2 is provided on the side of the outer circumferential main groove 52, and the first sipe 51 is provided on the side of the pattern end E1.

Figure 3D:
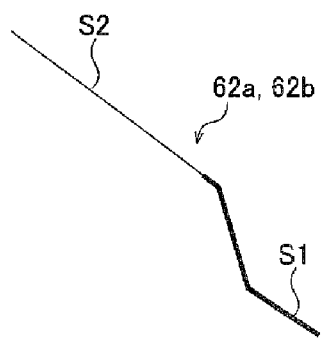

As understood from FIG. 2 and FIG. 3D, in each of the sipes 62a and 62b, the second sipe S2 is provided on the side of the outer circumferential main groove 56, and the first sipe S1 is provided on the side of the inner circumferential main groove 54. In each of the sipes 62a and 62b, the connection position of the first sipe S1 and the second sipe S2 is provided such that the steep inclination portion at which the inclination with respect to the tire lateral direction is steep functions as the first sipe S1.

Figure 3E:
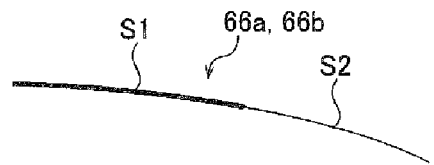

Further, as understood from FIG. 2 and FIG. 3E, in each of the sipes 66a and 66b, the second sipe S2 is provided on the side of the outer circumferential main groove 56, and the first sipe S1 is provided on the side of the pattern end E2.

Figure 5:
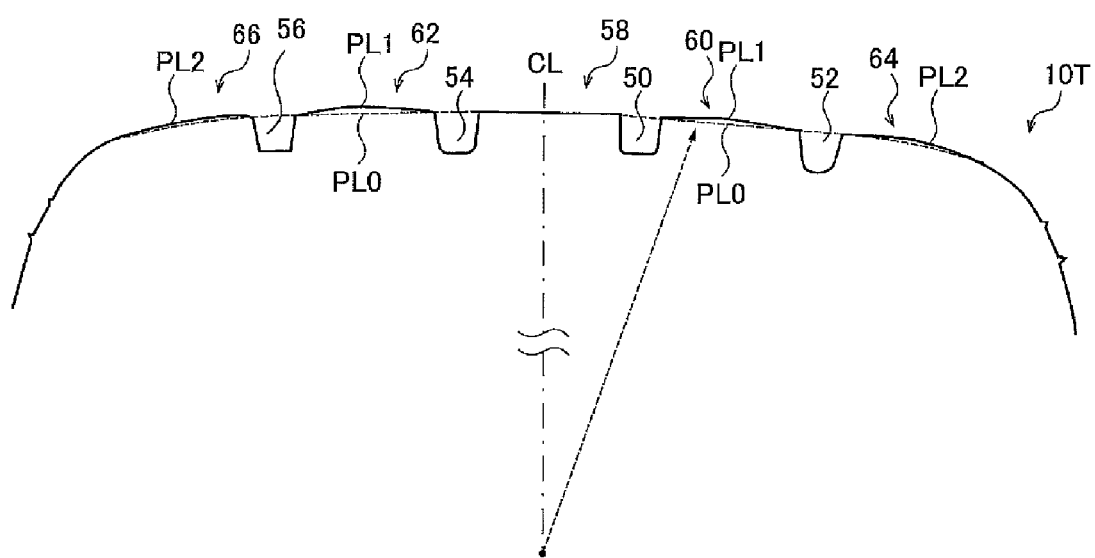
FIG. 5 is a diagram illustrating profile lines formed by land portions of the tire according to the embodiment.

FIG. 5 is a diagram illustrating profile lines formed by each of the land portions provided with the sipes described above.

As illustrated in FIG. 5, the intermediate land portions 60 and 62 and the side land portions 64 and 66 include swelling profile lines PL1 and PL2. The center land portion 58 forms a base profile line PL0. Here, the base profile line PL0, in the profile cross-section of the tread portion which is taken along the tire lateral direction, refers to an arc line of a circle which has a center point positioned on the tire equator line CL and passes through at least: two land portion edge points at which the intermediate land portion 60 is connected to the two circumferential main grooves (the inner circumferential main groove 50 and the outer circumferential main groove 52); and one side land portion edge point at which the side land portion 64 is connected to the outer circumferential main groove 52. Alternatively, the base profile line PL0, in the profile cross-section of the tread portion, which is taken along the tire lateral direction, refers to an arc line of a circle which has a center point positioned on the tire equator line CL and passes through at least: two land portion edge points at which the intermediate land portion 62 is connected to the two circumferential main grooves (the inner circumferential main groove 54 and the outer circumferential main groove 56); and one side land portion edge point at which the side land portion 66 is connected to the outer circumferential main groove 56. In many cases, the profile lines of the tread portion have a line-symmetric shape with respect to the tire equator line CL. In such case, the base profile line PL0 passes through the two land portion edge points and the one side land portion edge point positioned on both sides in the tire lateral direction. Note that a case where the base profile line PL0 passes through the two land portion edge points and the one side land portion edge point includes a case where the base profile line PL0 passes through positions slightly deviated from those points in addition to a case where the base profile line PL0 passes through those points accurately. In this case, the base profile line PL0 is preferably set to such arc line that a total distance from each point to the arc line is minimized. For example, in a case of the profile lines in line symmetry with respect to the tire equator line CL, the base profile line PL0 is preferably set to an arc line of a circle having a center point on the tire equator line CL, the arc line having a radius where a total distance from the two land portion edge points and the one side land portion edge point positioned on both the sides in the tire lateral direction is minimized.

Meanwhile, the swelling profile lines PL1 and PL2 are profile lines protruding outward in the tire radial direction with respect to the base profile line. Specifically, the profile lines of the intermediate land portions 60 and 62 protrudes outward in the tire radial direction with respect to the base profile line PL0 passing through the land portion edge points of each land portion, and the profile lines of the side land portions 64 and 66 protrudes outward in the tire radial direction with respect to the base profile line PL0 passing through the side land portion edge point of each land portion.

A protrusion amount of the swelling profile lines PL1 and PL2 with respect to the base profile line PL0 falls within a range of from, for example, 0.1 mm to 1.0 mm.

As described above, in each region of the intermediate land portions 60 and 62 and the side land portions 64 and 66 having the swelling profile lines PL1 and PL2, the composite sipe in which the first sipe 51 and the second sipe S2 are connected is provided. In the composite sipe, at the portion connected to the outer circumferential main grooves 52 and 56, the second sipe S2 is disposed.

The tread portion 10T includes the embodiments described above. Thus, uneven wear resistance can be improved, and pattern noise can be mitigated at the same time.

Specifically, the profile lines of the intermediate land portions 60 and 62 and the side land portions 64 and 66 are set to swelling profile lines. With this, the ground contact length of the intermediate land portions 60 and 62 and the side land portions 64 and 66, which is small in the related art, can be increased, and the ground contact pressure can be uniformed as much as possible. In this manner, wear of the intermediate land portions 60 and 62 and the side land portions 64 and 66 can be suppressed. However, rigidity of local regions of the intermediate land portions 60 and 62 and the side land portions 64 and 66, which are close to the outer circumferential main grooves 52 and 56, (this rigidity is referred to as block rigidity) is likely to be lowered as compared to the other regions, and uneven wear is still likely to occur in the local regions. Thus, in order to improve the rigidity of the local regions, the second sipes S2 are provided in the regions. As illustrated in FIG. 4B, the second sipe S2 has a wave-like shape in the sipe depth direction. Thus, even when the local regions are brought into contact with road surfaces and are deformed, the sipe wall surfaces in the wave-like shape are engaged and supported with each other. Thus, the block rigidity of the local regions can be improved. The rigidity of the local regions is improved in this manner, and hence uneven wear resistance of the local regions is improved. However, when rigidity of the entirety of the intermediate land portions 60 and 62 and the side land portions 64 and 66 is improved by providing the second sipes S2 in the local regions, patten noise, which is generated by bringing the tread surface of the intermediate land portions 60 and 62 and the side land portions 64 and 66 into contact with (collision with) road surfaces, is increased. Particularly, the ground contact length of the intermediate land portions 60 and 62 and the side land portions 64 and 66 is increased due to the swelling profile lines. Thus, the region of the tread surface of the intermediate land portions 60 and 62 and the side land portions 64 and 66, which is brought into contact with road surfaces, is increased. As a result, pattern noise is more likely to be increased. Thus, in order to prevent the rigidity of the entirety of the intermediate land portions 60 and 62 and the side land portions 64 and 66 from being excessively high, the first sipes S1, which can lower rigidity as compared to the second sipes S2, are provided in the regions of the intermediate land portions 60 and 62 and the side land portions 64 and 66, which are away from the outer circumferential main grooves 52 and 56. Unlike the second sipe S2, the first sipe S1 is not provided with wave-like sipe wall surfaces that are engaged and supported with each other along with deformation. Thus, when the first sipes S1 are provided, rigidity is lowered.

According to the embodiment, the length in the tire lateral direction of the composite sipe formed of the first sipe S1 and the second sipe S2 in each of the intermediate land portions 60 and 62 and the side land portions 64 and 66 is 40% or more of the length in the tire lateral direction of the region of each land portion having the swelling profile line, the region being in contact with road surfaces. In this case, the length of the second sipe S2 along the extension direction preferably falls within a range of from 20% to 80% of the length of the composite sipe along the extension direction, in terms of improvement in uneven wear resistance of the local regions. When the length of the second sipe S2 along the extension direction is less than 20% of the length of the composite sipe along the extension direction, uneven wear resistance is lowered. When the length of the second sipe S2 along the extension direction exceeds 80% of the length of the composite sipe along the extension direction, an effect of the first sipe S1 is small, and pattern noise is increased.

Further, according to the embodiment, of positions of the intermediate land portions 60 and 62 in the tire lateral direction at which the regions of the second sipes S2 and the regions of the first sipes S1 are connected, an innermost position in the tire lateral direction is set as a boundary position. A total length of lengths of all the first sipes S1 along the extension direction, which are provided in a boundary inner region (including the center land portion 58) inward in the tire lateral direction with respect to the boundary position, is preferably 70% or more of a total length of lengths of all the sipes along the extension direction, which are provided in the boundary inner region. With this, in the boundary inner region, an effect of the first sipes S1 for lowering rigidity of the land portions is further increased, and hence reduction of pattern noise is further improved.

The first sipes S1 of the composite sipes provided in the regions of the intermediate land portions 60 and 62 are opened to the inner circumferential main grooves 50 and 54. Thus, rigidity of the regions of the intermediate land portions 60 and 62, which are in the vicinities of the inner circumferential main grooves 50 and 54, is low, which contributes to reduction of pattern noise. Unlike the local regions of the intermediate land portions 60 and 62 and the side land portions 64 and 66, which are in the vicinities of the outer circumferential main grooves 52 and 56, the ground contact length is likely to be ensured, and uneven wear is less likely to occur in the regions of the intermediate land portions 60 and 62, which are in the vicinities of the inner circumferential main grooves 50 and 54. Thus, even when the first sipes S1 are provided to be opened to the inner circumferential main grooves 50 and 54, uneven wear resistance performance is not lowered.

Further, according to the embodiment, as illustrated in FIGS. 3A and 3B, when the sipes 60a and 60b are sipes having a peak-like shape protruding to one side in the tire circumferential direction, the position in the tire lateral direction at which the region of the first sipe S1 and the region of the second sipe S2 are connected in each of the sipes 60a and 60b is preferably positioned outward in the tire lateral direction with respect to the position of the protrusion end of the peak-like shape in the tire lateral direction. Therefore, the protrusion end of the peak-like shape is positioned in the region of the first sipe S1. With this, the region of the second sipe S2 is positioned in the skirt region of the peak-like shape, which changes smoothly, and hence engagement between the sipe wall surfaces of the second sipe S2 is stabilized.

As described above, the profile line of the center land portion 58 is set to the base profile line PL0, and the sipe 58a being the first sipe S1 is provided in the region of the center land portion 58. With this, pattern noise is largely reduced.

Further, according to the embodiment, when the land portion including the second sipe S2 is viewed from outward in the tire radial direction, the second sipe S2 may be a straight line or a curved line that is smoothly curved or may further meander in a wave-like shape. Specifically, the sipe wall surfaces of the second sipe S2 may be recess/protrusion surfaces forming a wave-like shape that protrudes and is recessed in the tire circumferential direction, the tire lateral direction, or in a direction inclined with respect to the tire lateral direction. The sipe wall surfaces of the second sipe S2 have a wave-like shape along two directions (the sipe depth direction and the sipe extension direction), and hence an effect that the sipe wall surfaces are engaged and supported with each other due to deformation is increased. Thus, the rigidity of the local regions of the intermediate land portions 60 and 62 and the side land portions 64 and 66, which are close to the outer circumferential main grooves 52 and 56, can further be improved, and uneven wear resistance is further improved.

In the embodiment described above, the intermediate land portions 60 and 62 and the side land portions 64 and 66 on both the sides in the tire lateral direction across the tire equator line CL include the swelling profile lines PL1 and PL2, the sipes, which are provided in the regions of the land portions on both the sides that include the swelling profile lines PL1 and PL2, are the composite sipes, and the intermediate land portion and the side land portion on any one side in the tire lateral direction includes the swelling profile lines PL1 and PL2. The sipes provided in the regions of the land portions having the swelling lines may be the composite sipes. Further, the land portion provided with the composite sipes may be at least one of the intermediate land portion and the side land portion.

Examples and Comparative Examples

In order to confirm effects of the tire according to the present embodiment, evaluation on uneven wear resistance and pattern noise was performed by variously changing shapes of the sipes.

The produced tires (tire size: 265/50R20 111W) each had a structure illustrated in FIG. 1 and a tread pattern illustrated in FIG. 2. Each of the produced tires was mounted to a rim (rim size: 20×8.5 J) (air pressure of 250 kPa), and was further mounted to a test vehicle (SUV with engine displacement of 3.6 liter).

Evaluation of Uneven Wear Resistance

With regard to uneven wear resistance, a remaining groove depth (average value) of the inner circumferential main grooves 50 and 54 was measured after the test vehicle traveled for 10,000 km, and a difference between the initial groove depth and the remaining groove depth that was measured was regarded as a wear amount in the center land portion 58. Further, a remaining groove depth (average value) of the outer circumferential main grooves 52 and 56 was measured, and a difference between the initial groove depth and the remaining groove depth that was measured was regarded as a wear amount in the local regions of the intermediate land portions 60 and 62, which were close to the outer circumferential main grooves 52 and 56. Further, a difference obtained by subtracting the wear amount in the center land portion 58 from the wear amount in the local regions was divided by the wear amount in the center land portion 58. The resultant value thus calculated was regarded as an evaluation value for uneven wear resistance. In Tables 1 and 2 given below, with regard to uneven wear resistance, reciprocals of the evaluation values of other Comparative Examples and Examples were indexed with a reciprocal of the evaluation value of Comparative Example 1 as a reference. The index of Comparative Example 1 was 100. Thus, a higher index indicates a better uneven wear resistance.

Evaluation on Pattern Noise

Meanwhile, with regard to pattern noise, while the test vehicle was traveling on predetermined dry road surfaces (at a speed of 100 km/h), a sound pressure level of cabin noise was measured by a microphone attached to a window-side position of a driver seat in the test vehicle. The cabin noise contained pattern noise, and change in the cabin noise was caused by change in the pattern noise. Therefore, the sound pressure level was evaluated as the pattern noise. In Tables 1 and 2 given below, a sound pressure level of Comparative Example 1 was set to 0, and differences (dB) between the sound pressure level of Comparative Example 1 and sound pressure levels of other Comparative Examples and examples were shown. When the difference is a negative value, and an absolute value of the negative value is larger, the pattern noise is lower.

In Examples and Comparative Examples shown in Tables 1 and 2 given below, when the intermediate land portions 60 and 62 and the side land portions 64 and 66 were provided with the swelling profile lines PL1 and PL2, the maximum swelling amount with respect to the base profile line PL0 was fixed to 0.2 mm. The center land portion 58 was provided with the base profile line PL0.

In Examples 1 to 6 and Comparative Example 3, when the composite sipes were provided in the regions of the intermediate land portions 60 and 62 and the side land portions 64 and 66, the second sipes S2 were provided so as to be opened to the outer circumferential main grooves 52 and 56.

"Length of second sipe along sipe extension direction/length of composite sipe along extension direction (%)" in Tables 1 and 2 given below indicates a ratio of the length of the second sipe along the sipe extension direction with respect to the length of the composite sipe along the extension direction in each of the sipes 60a, 60b, 62a, 62b, 64a, 64b, 66a, and 66b in the intermediate land portions 60 and 62 and the side land portions 64 and 66.

The composite sipe in which the first sipe S1 and the second sipe S2 are connected is provided in each of the regions of the intermediate land portions 60 and 62 and the side land portions 64 and 66, which include the swelling profile lines PL1 and PL2. In the composite sipe, the second sipe S2 is disposed in a portion connected to the outer circumferential main groove 52 or 56. From the comparison between Comparative Examples 1 to 3 and Example 1, it can be understood that, with this configuration, uneven wear resistance is improved and pattern noise is reduced.

In a case where the composite sipes are provided in the regions of the intermediate land portions 60 and 62 and the side land portions 64 and 66, when the ratio of the length of the second sipe along the sipe extension direction with respect to the length of the composite sipe along the extension direction falls within a range of from 20% to 80%, the index for uneven wear resistance is 103 or more, and reduction of pattern noise is 0.3 dB or more. Thus, from the comparison of Examples 1 to 5, it can be understood that a preferable effect is exerted.

Based on comparison between Examples 1 and 6, it can be understood that the first sipe S1 is preferably provided in the center land portion 58 in terms of the reduction of pattern noise.

The foregoing has been a detailed description of the pneumatic tire according to embodiments of the present technology. However, the pneumatic tire according to an embodiment of the present technology is not limited to the

TABLE 1

|  | Comparative Example 1 | Comparative Example 2 | Comparative Example 3 | Example 1 |
| --- | --- | --- | --- | --- |
| Profile line of intermediate land portion and side land portion is base profile line or swelling profile line | Base profile line | Swelling profile line | Base profile line | Swelling profile line |
| Sipe type in intermediate land portion and side land portion | Second sipe | Second sipe | Composite sipe | Composite sipe |
| Length of second sipe along extension direction/length of composite sipe along extension direction (%) | 100 | 100 | 40 | 40 |
| Sipe in center land portion is first sipe or second sipe | First sipe | First sipe | First sipe | First sipe |
| Uneven wear resistance | 100 | 112 | 98 | 104 |
| Pattern noise (dB) | 100 | 0.6 | −0.3 | −0.5 |

TABLE 2

|  | Example 2 | Example 3 | Example 4 | Example 5 | Example 6 |
| --- | --- | --- | --- | --- | --- |
| Profile line of intermediate land portion and side land portion is base profile line or swelling profile line | Swelling profile line | Swelling profile line | Swelling profile line | Swelling profile line | Swelling profile line |
| Sipe type in intermediate land portion and side land portion | Composite sipe | Composite sipe | Composite sipe | Composite sipe | Composite sipe |
| Length of second sipe along extension direction/length of composite sipe along extension direction (%) | 10 | 20 | 80 | 90 | 40 |
| Sipe in center land portion is first sipe or second sipe | First sipe | First sipe | First sipe | First sipe | Second sipe |
| Uneven wear resistance | 102 | 103 | 107 | 109 | 106 |
| Pattern noise (dB) | −0.7 | −0.6 | −0.3 | −0.2 | −0.2 |

The invention claimed is:

1. A pneumatic tire comprising a tread portion, the tread portion comprising:
   an intermediate land portion delimited by two circumferential main grooves in a tire lateral direction, the intermediate land portion being positioned on one side in the tire lateral direction with a tire center line as a boundary; and
   a side land portion adjoining an outer circumferential main groove of the two circumferential main grooves, the side land portion being provided outside the outer circumferential main groove in the tire lateral direction, and including a ground contact edge of the pneumatic tire within a region thereof,
   the tread portion having, in a profile cross section of at least one land portion of the intermediate land portion and the side land portion along the tire lateral direction, a swelling profile line that protrudes outward in a tire radial direction with respect to a base profile line that is an arc of a circle having a center point positioned on the tire center line and passing through at least two land portion edge points at which the intermediate land portion is connected to the two circumferential main grooves and one side land portion edge point at which the side land portion is connected to the outer circumferential main groove,
   the tread portion being provided with a plurality of sipes extending in the tire lateral direction at an interval in a tire circumferential direction in a region of a swelling land portion formed in the swelling profile line in the intermediate land portion or the side land portion,
   the plurality of sipes comprising:
   first sipes having a shape extending linearly from the tread surface in a sipe depth direction and being opened to an inner circumferential main groove of the two circumferential main grooves; and
   second sipes being bent or curved in a wave manner and protruding in a direction orthogonal to the sipe depth direction and orthogonal to an extension direction in which the plurality of sipes extend on the tread surface, when advancing from the tread surface in the sipe depth direction,
   the plurality of sipes being composite sipes each formed by one of the first sipes and one of the second sipes connected each other in the extension direction, and
   the second sipes being positioned on a side of the outer circumferential main groove with respect to the first sipes in the swelling land portion, and the second sipes being opened to the outer circumferential main groove; wherein
   lengths of the composite sipes in the tire lateral direction are 40% or more of a length of a contact region in contact with a road surface in the swelling land portion in the tire lateral direction,
   lengths of the second sipes in the extension direction fall within a range of from 30% to 80% of the lengths of the composite sipes in the extension direction, and
   the second sipes do not include a linearly extending portion in the sipe depth direction.

2. The pneumatic tire according to claim 1, wherein
   the swelling land portion comprises the intermediate land portion,
   the tread portion comprises a boundary inner region that is positioned inward in the tire lateral direction toward the tire center line with respect to a boundary position that is an innermost position in the tire lateral direction of a plurality of connecting positions in the intermediate land portion in the tire lateral direction, the plurality of connecting positions each being a position at which one of the second sipes and one of the first sipes are connected each other, and
   a total length of lengths of all the first sipes along the extension direction within the boundary inner region, is 70% or more of a total length of lengths of all sipes within the boundary inner region along the extension direction.

3. The pneumatic tire according to claim 2, wherein
   the swelling land portion includes the intermediate land portion,
   the composite sipes in the intermediate land portion are opened to the two circumferential main grooves,
   the first sipes are positioned on a side of an inner circumferential main groove positioned inward in the tire lateral direction of the two circumferential main grooves with respect to the regions provided with the second sipes and are opened to the inner circumferential main groove.

4. The pneumatic tire according to claim 3, wherein
   each of the composite sipes in the intermediate land portion comprises a peak-shaped sipe protruding to one side in the tire circumferential direction, and
   a connecting position in the tire lateral direction at which one of the regions of the second sipes and one of the regions of the first sipes are connected is positioned outward in the tire lateral direction with respect to a position of a protrusion end of the peak-shaped sipe in the tire lateral direction.

5. The pneumatic tire according to claim 4, wherein
   the swelling land portion comprises the side land portion, and
   the first sipes in the composite sipes provided in a region of the side land portion are positioned in a contact region in which the side land portion is in contact with a road surface.

6. The pneumatic tire according to claim 5, wherein
   the tread portion comprises the swelling land portion and the composite sipes on each of both sides in the tire lateral direction across the tire center line as a boundary,
   the tread portion comprises a center land portion through which the tire center line passes, the center land portion being delimited by the intermediate land portion on each of both the sides in the tire lateral direction,
   the swelling land portion comprises the intermediate land portion and the side land portion,
   a profile line of the center land portion is the base profile line, and
   a region of the center land portion is provided with the first sipes.

7. The pneumatic tire according to claim 6, wherein, when the swelling land portion is viewed from outward in the tire radial direction, the second sipes meander in a wave-like shape.

8. The pneumatic tire according to claim 1, wherein
   the swelling land portion includes the intermediate land portion,
   the composite sipes in the intermediate land portion are opened to the two circumferential main grooves,
   the first sipes are positioned on a side of an inner circumferential main groove positioned inward in the tire lateral direction of the two circumferential main grooves with respect to the regions provided with the second sipes and are opened to the inner circumferential main groove.

9. The pneumatic tire according to claim 8, wherein each of the composite sipes in the intermediate land portion comprises a peak-shaped sipe protruding to one side in the tire circumferential direction, and a connecting position in the tire lateral direction at which the second sipes and the first sipes are connected is positioned outward in the tire lateral direction with respect to a position of a protrusion end of the peak-shaped sipe in the tire lateral direction.

10. The pneumatic tire according to claim 1, wherein the swelling land portion comprises the side land portion, and the first sipes in the composite sipes provided in a region of the side land portion are positioned in a contact region in which the side land portion is in contact with a road surface.

11. The pneumatic tire according to claim 1, wherein the tread portion comprises the swelling land portion and the composite sipes on each of both sides in the tire lateral direction across the tire center line as a boundary, the tread portion comprises a center land portion through which the tire center line passes, the center land portion being delimited by the intermediate land portion on each of both the sides in the tire lateral direction, the swelling land portion comprises the intermediate land portion and the side land portion, a profile line of the center land portion is the base profile line, and a region of the center land portion is provided with the first sipes.

12. The pneumatic tire according to claim 11, wherein the tread portion comprises a first intermediate land portion and a second intermediate land portion, the first intermediate land portion being positioned on a first side in the tire lateral direction with the tire center line as the boundary, the second intermediate land portion being positioned on a second side in the tire lateral direction with the tire center line as the boundary, the second side being opposite to the first side, the center land portion extends continuously along the two circumferential main grooves, the first intermediate land portion extends continuously along the two circumferential main grooves, and the second intermediate land portion comprises a plurality of lug grooves, the plurality of lug grooves, together with the two circumferential main grooves, delimitating the second intermediate land portion into a plurality of blocks.

13. The pneumatic tire according to claim 1, wherein, when the swelling land portion is viewed from outward in the tire radial direction, the second sipes meander in a wave-like shape.

14. The pneumatic tire according to claim 1, wherein the intermediate land portion protrudes outward from the profile line further than the side land portion.

* * * * *